March 31, 1970     C. L. SELBY, JR     3,503,480
MEANS OF SELF-ENFORCING PARKING
Filed July 2, 1968
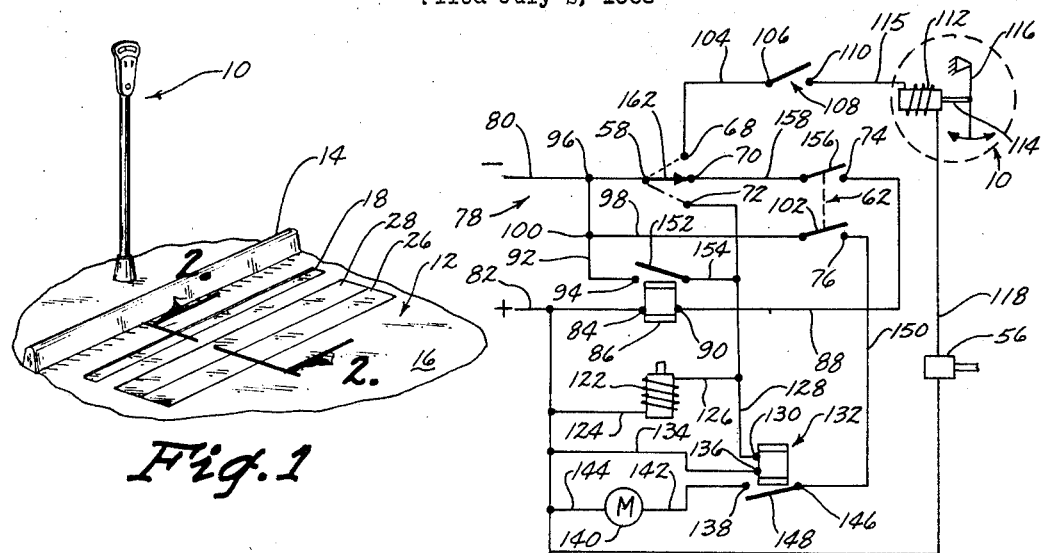
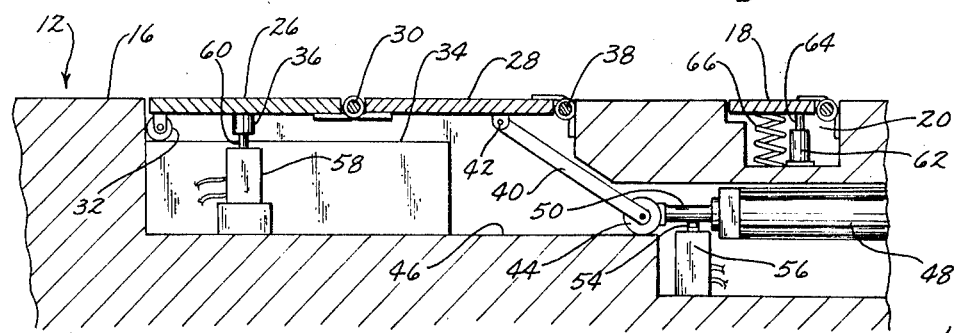
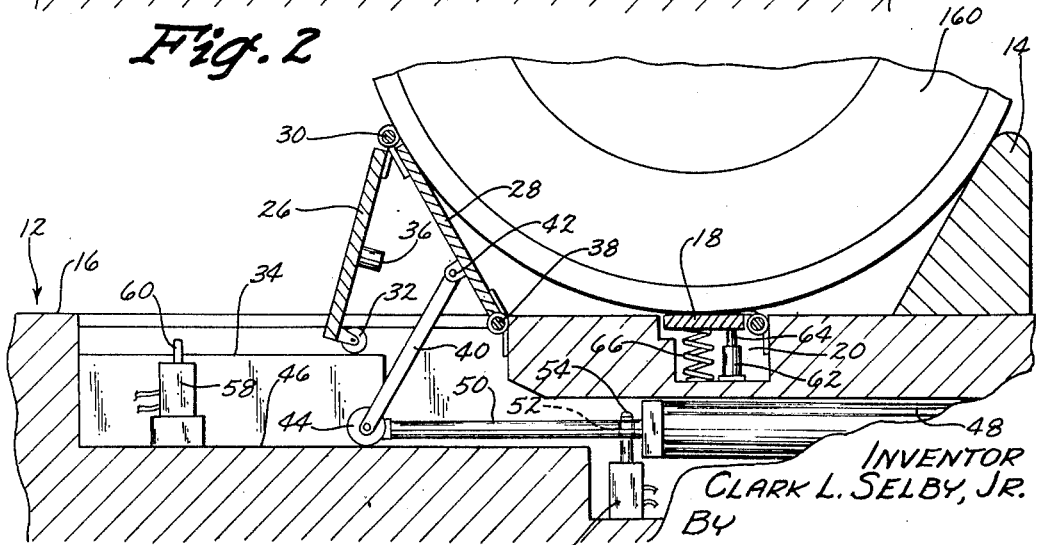
INVENTOR
CLARK L. SELBY, JR.
BY
Zarley, McKee & Thomte
ATTORNEYS United States Patent Office 3,503,480
Patented Mar. 31, 1970

3,503,480
MEANS OF SELF-ENFORCING PARKING
Clark L. Selby, Jr., 9543 Walmer Lane,
Overland Park, Kans. 66212
Filed July 2, 1968, Ser. No. 741,985
Int. Cl. G07f 1/00, 3/00, 5/00, 9/00
U.S. Cl. 194—1                    1 Claim

ABSTRACT OF THE DISCLOSURE

A method and means of self-enforcing parking whereby the driver deposits money into a parking meter only for that time which the vehicle was actually parked in the parking space. A parking barrier raises from the parking surface when the vehicle is driven into the parking space. The vehicle energizes various pressure switches which causes the parking meter to be activated. When the driver desires to remove the vehicle from the parking space, he must deposit sufficient coins into the parking meter to pay for the elapsed parking time and the charges therefor. When the proper amount of coins have been deposited, the parking barrier lowers from behind the vehicle wheels to permit the vehicle to leave the parking area.

---

Conventional parking systems are generally unsatisfactory due to the fact that persons can park in parking spaces utilizing parking meters without depositing money into the meters. The biggest disadvantage in available parking is in the private parking area such as a parking lot having large number of parking spaces. These areas do not generally come under police jurisdiction since they are for private management. Thus, if parking meters are provided in the parking lot, the drivers sometimes attempt to avoid depositing money in the parking meters since they realize that a ticket for a parking violation will not be issued. The solution to the above problem has been to provide attendants at the parking areas to collect the money for the parking charges. Obviously, this solution is less than desirable due to the costs and administrative details associated therewith.

Therefore, it is a principal object of this invention to provide a method and means of self-enforcing parking.

A further object of this invention is to provide a means for parking a vehicle utilizing a parking meter wherein the driver pays for the time the vehicle was in the parking space.

A further object of this invention is to provide a self-enforcing type of parking system.

A further object of this invention is to provide a parking system that prevents the vehicle from being removed from the parking space until a predetermined amount of money has been inserted into a parking meter.

A further object of this invention is to provide a parking system that eliminates the need for the driver to insert money into the parking meter in advance.

A further object of this invention is to provide a parking control device which signals when the vehicle is properly parked in a parking space.

A further object of this invention is to provide a parking control device which eliminates the need of a person being in attendance at a parking lot.

A further object of this invention is to provide a parking control device which is adapted for use with any conventional parking meter.

A further object of this invention is to provide a parking control device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a parking space utilizing the structure of this invention;

FIG. 2 is an enlarged sectional view as seen along lines 2—2 of FIG. 1 and illustrating the parking barrier in a lowered position;

FIG. 3 is a sectional view similar to that of FIG. 2 except that the parking barrier is illustrated in a raised position behind the vehicle wheel; and FIG. 4 is a schematic view of the circuitry of this invention.

In FIG. 1, the numeral 10 generally designates a conventional parking meter such as the Model 50 parking meter manufactured by Duncan Parking Meter Corporation, 751 Pratt Blvd., Elk Grove Village, Ill. The meter 10 is positioned forwardly of a parking space generally designated by the reference numeral 12 having a parking curb 14 extending upwardly from the surface 16 of the parking space 12. An elongated pressure plate 18 is pivotally mounted in a channel 20 formed in the surface 16 while a pivotal parking barrier 22 is mounted in a compartment 24 formed in the surface 16.

Parking barrier 22 is comprised of plates 26 and 28 pivotally secured together at 30 to permit their movement from the position seen in FIG. 2 to the position seen in FIG. 3. The free end of plate 26 has a roller means 32 which is adapted to roll upon the shoulder 34 formed in the compartment 24 (FIG. 3). Plate 26 is also provided with a finger 36 which extends downwardly therefrom as best illustrated in FIGS. 2 and 3. Plate 28 is pivotally secured to the surface 16 at 38 and has an arm member 40 pivotally secured thereto at 42. A roller 44 is secured to the other end of arm member 40 and is adapted to roll upon shoulder 46 provided in compartment 24. The numeral 48 generally indicates a hydraulic cylinder means having a rod 50 slidably extending from one end thereof which is operatively connected to the roller 44 so that the extension of the rod 50 by the cylinder 48 will cause the parking barrier 22 to be moved from the position of FIG. 2 to the position of FIG. 3. Rod 50 is provided with an opening 52 formed therein which is adapted to receive a plunger 54 extending from a solenoid 56.

As seen in FIGS. 2 and 3, a pressure switch 58 is mounted in compartment 24 and has a plunger 60 extending upwardly therefrom which is adapted to be engaged by the finger 36 extending downwardly from plate 26. The numeral 62 generally designates a pressure switch which is positioned in channel 20 and has a plunger 64 extending upwardly therefrom which is adapted to engage the under side of the plate 18. A spring means 66 is also provided in channel 20 and yieldably resists the downward movement of the plate 18 into channel 20.

With respect to FIG. 4, it can be seen that pressure switch 58 is provided with contacts 68, 70 and 72 and is a conventional three position pressure switch. Pressure switch 62 is a double pole, single throw pressure switch which is normally open and includes contacts 74 and 76.

The numeral 78 generally designates a source of electrical energy such as 115 volts alternating current and includes a "hot" lead 80 and a ground 82. As seen in FIG. 4, lead 80 extends to the pressure switch 58 while lead 82 extends to a contact 84 of a single pole, single throw, normally open time delay relay 86. A lead 88 extends from contact 90 of relay 86 and is connected to the contact 74 of switch 62. A lead 92 extends from terminal 94 of relay 86 and is conected to lead 80 at 96. Lead 98 is connected to lead 92 at 100 and is connected to terminal 102 of switch 62. Lead 104 is connected to terminal 68 of switch 58 and extends to terminal 106 of a timer cam 108. Terminal 110 of timer cam 108 is connected to a solenoid 112 by a lead 114. Solenoid 112 is positioned in the parking meter which is generally designated by the reference numeral 10 and the plunger 114 of the solenoid 112 is operatively connected to a signal means 116. Solenoid 112 is connected to solenoid 56 by a lead 118. Solenoid 56 is connected to lead 82 by a lead 120. Lead 120 is connected to a timer index solenoid 122 by a lead 124 and a lead 126 connects the solenoid 122 to lead 128 extending from terminal 72 of switch 58 to terminal 130 of a single pole, single throw, normally open time delay relay 132. Relay 132 is connected to lead 120 by a lead 134 extending from terminal 136. Terminal 138 of relay 132 is connected to an induction motor 140 by a relay 142. Motor 140 is connected to lead 120 by a lead 144. The numeral 146 designates a terminal operatively connected to a contact element 148 by a lead 150.

The numeral 152 generally designates a contact element in relay 86 which is operatively connected to lead 128 by a lead 154. Terminal 70 of switch 58 is connected to contact element 156 of switch 62 by a lead 158.

Motor 140 is operatively connected to a hydraulic pump (not shown) which is in fluid communication with the hydraulic cylinder 48 whereby energization of the motor 140 will cause the extension of rod 50 from the hydraulic cylinder 48. Rod 50 of hydraulic cylinder 48 is spring loaded to normally urge the rod 50 into hydraulic cylinder 48. When motor 140 is de-energized, the spring means in the hydraulic cylinder 48 causes the rod 50 to move into the cylinder body provided the plunger 54 of solenoid 56 is not extending through opening 52. The hydraulic fluid in the cylinder 48 is returned to the hydraulic pump by a suitable bypass line when the rod 50 moves into the hydraulic cylinder body.

In operation, the vehicle would enter the parking area so that the front wheel 160 of the vehicle would first pass over plates 26 and 28 and then abut against curb 14. When wheel 160 is positioned against curb 14, the wheel is positioned over plate 18 as illustrated in FIG. 3. As wheel 160 passes over plate 26, the plate is moved slightly downwardly to cause the plunger 60 of solenoid 58 to be depressed thereby causing the contact 162 of switch 58 to engage the terminal 70 thereby causing lead 80 and contact 156 to be electrically connected. When the wheel 160 is properly positioned, the plate 18 is slightly moved downwardly to depress the plunger 64 of pressure switch 62 thereby causing the contact 156 to engage terminal 74 and causing contact 102 to engage terminal 76. The engagement of contact 102 with terminal 76 causes the time delay relay 132 to be energized. Preferably, relay 132 is designed so that it will be energized for approximately 15 seconds. The energization of relay 132 for approximately 15 seconds causes the motor 140 to be run for the same length of time which causes the extension of the rod 50 from the hydraulic cylinder 48 and causing the plates 26 and 28 to be pivoted upwardly behind the vehicle wheel to form a barrier behind the same to prevent the vehicle from leaving the parking space. When rod 50 is extended, the spring loaded plunger 52 of solenoid 56 is urged upwardly into the opening 52 of the rod 50 to prevent the rod 50 from withdrawing into the body of the hydraulic cylinder upon de-energization of the motor 140. The switch 58 yields back into a neutral position after the vehicle wheel passes thereover until the pressure switch 62 is made after which time the contact 162 moves into engagement with the terminal 68. The electrical connection between contact 162 and terminal 68 causes the timer cam 108 to be energized thereby energizing solenoid 112. De-energization of solenoid 112 would pivot the indicator 116 within the meter 10 so that the indicator would not be visible to the motor. For convenience, the indicator could have the words "available parking" thereon which would be visible to the motorist in the meter 10 when the solenoid 112 is not energized.

When the relay 132 is energized, the timer index solenoid 112 would be energized thereby starting the timer located within the parking meter. The plunger of the solenoid 122 is operatively connected to the timer index to cause the timer to be started when the solenoid 122 is energized. The timer in the meter will indicate the lapsed time on a dial which will be visible to the motorist.

Thus, when the motorist pulls into the parking space, the activation of the pressure switches 58 and 62 causes the parking barrier 22 to be raised behind the vehicle wheel to prevent the vehicle from leaving the parking space until the proper amount of coins have been placed in the meter which would be determined by the amount of time that has elapsed since the motorist drove into the parking space. When the proper amount of coins have been placed into the meter, the timer cam 108 will be energized thereby causing the energization of solenoid 112. The energization of solenoid 112 causes the relay 86 to be de-energized for a period of time which is preferably approximately 90 seconds. The de-energization of the relay 86 causes plunger 54 of solenoid 56 to be withdrawn from the opening 52 in the rod 50 which permits the rod 50 to move into the hydraulic cylinder 48 thereby causing the plates 26 and 28 to move from the position of FIG. 3 to the position of FIG. 2 to permit the vehicle to leave the parking space. If the vehicle would remain in the parking stall more than 90 seconds after the proper amount of coins have been placed in the meter, the pressure switch 62 would still be closed thereby causing the relay 86 to be energized for a predetermined amount of time which is approximately five seconds which would cause the entire system to be again operated.

Thus it can be seen that a unique means has been provided for permitting a motorist to pay only for that time in which the vehicle was actually parked in the parking stall and which will not permit the vehicle to be moved from the parking stall until the proper amount of money has been placed in the meter. The internal components of the parking meter have not been shown in detail since the parking meters available do vary somewhat in their internal construction. Thus, the exact means of connecting the solenoid 122, timer cam 108 and indicator 116 to the remainder of the circuitry will necessarily vary somewhat from one type of meter to another. However, a person having ordinary skill in the art will obviously be able to apply the described circuitry to the particular type of parking meter being used. The circuitry illustrated in FIG. 4 is the preferred circuitry although some variations can be made therein but not without some sacrifice in efficiency of operation. It should be noted that the primary purpose of the instant invention is to provide a self-enforcing parking system and that the circuitry illustrated in FIG. 4 is the preferred embodiment. Thus it can be seen that the invention accomplishes at least all of its stated objectives.

Some changes may be made in the construction and arrangement of my Method and Means of Self-Enforcing Parking without departing from the real spirit and purpose of my invention.

I claim:
1. In a parking system,
   a parking area adapted to accommodate a vehicle and having a curb means adapted to limit the movement of at least one wheel of said vehicle in one direction,
   a parking meter means positioned adjacent said parking area,
   a barrier means movably mounted in said parking area and adapted to be moved between first and second positions, said barrier means adapted to permit said vehicle to enter said parking area when in its first position and adapted to prevent the vehicle from leaving the parking area when in its second position,
   a control means operatively connecting said parking meter means and said barrier, said control means activating said parking meter means when said vehicle enters the parking area and causing said barrier means to be moved to its second position, said control means causing said barrier means to remain in its second position during the time the vehicle is parked in said parking area, said parking meter means adapted to deactivate said control means to cause said barrier to move to its first position upon the insertion of a monetary amount into said meter means corresponding to the length of time the vehicle was parked in the parking area, said barrier means being flush with the parking area when in its first position, said control means including first and second electrically controlled pressure switches which must be successively actuated by the vehicle wheel as it passes thereover, one of said switches being positioned beneath said one vehicle wheel when the vehicle is in its parked position, the other of said pressure switches being positioned beneath said barrier means.

References Cited
UNITED STATES PATENTS

| | | |
|---|---|---|
| 2,094,216 | 9/1937 | Hunter. |
| 2,588,502 | 3/1952 | Dunn. |
| 2,627,920 | 2/1953 | Barlow. |
| 2,805,498 | 9/1957 | Mosher et al. |

STANLEY H. TOLLBERG, Primary Examiner